United States Patent Office 3,692,560
Patented Sept. 19, 1972

3,692,560
ACID HARDENING RESINS WHICH CAN BE ACTIVATED BY ULTRAVIOLET LIGHT
Hans-Jürgen Rosenkranz, Krefeld, and Hans Rudolph and Hans-Joachim Kreuder, Krefeld-Uerdingen, Germany, assignors to Farbenfabriken Bayer Aktiengesellschaft, Leverkusen, Germany
No Drawing. Filed Aug. 31, 1970, Ser. No. 68,541
Claims priority, application Germany, Sept. 18, 1969,
P 19 47 194.4
Int. Cl. C09d 3/52, 3/54, 3/58
U.S. Cl. 117—93.31                                6 Claims

ABSTRACT OF THE DISCLOSURE

The invention relates to acid-hardening resin compositions having incorporated therein a benzophenone compound each of the two benzene nuclei of which being substituted by a halogenated methyl group. If said compositions are irradiated by UV-light said benzophenone compound splits off hydrogen halide which, in turn, catalyses the hardening of the resin composition.

---

It is known to add halogen-containing organic compounds, for example, bromoform, iodoform, carbon tetrabromide, hexabromoethane, bromal, 2,5-dimethyl-$\omega$-tribromo-acetophenone and 9,10-dibromo-anthracene, to acid hardening resins or resin mixtures. When such mixtures are illuminated with ultraviolet light, acids are liberated from these additives, and these acids, in turn, bring about the hardening of the resin or resin mixtures. Preparations of this type have already been used, for example, in reproduction technique [Dutch "Offenlegungsschrift" (published specification) No. 6,512,894].

The majority of low-molecular halogen compounds, however, are volatile, they have a penetrating odour and irritate the mucous membranes. Some are not altogether thermally stable so that the preparations to which they have been added are not storable for a prolonged period of time.

The subject matter of the invention is the use of benzophenone derivatives of the formula

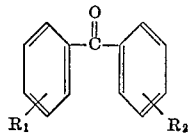

in which
$R_1 = CH_2X$, $CHX_2$, $CX_3$;
$R_2 = H$, $CH_3$, $CH_2X$, $CHX_2$, $CX_3$;
$X =$ halogen, as hardening catalysts for acid hardening resins and resin mixtures, which can be activated by ultraviolet light.

These compounds do not have the aforesaid disadvantages. Compared with the hitherto known acid catalysts which are sensitive to light, they are, moreover, characterised by a higher sensitivity to ultraviolet light and, consequently by higher reactivity. On the other hand, their stability is such that they can be stored for any length of time at room temperature, but also at slightly elevated temperature, in mixture with the resins concerned.

The following compounds can be used for the purpose of the invention, for example:

p-benzoyl-benzyl chloride,
p-benzoyl-benzal chloride,
p-benzoyl-benzotrichloride,
p-benzoyl-benzyl bromide,
p-benzoyl-benzal bromide,
p-benzoyl-benzotribromide,
4,4'-bis-chloromethyl-benzophenone,
4,4'-bis-dichloromethyl-benzophenone,
4,4'-bis-trichloromethyl-benzophenone,
4,4'-bis-bromomethyl-benzophenone,
4,4'-bis-dibromomethyl-benzophenone,
4,4'-bis-tribromomethyl-benzophenone and
o-benzoyl-benzotrichloride.

Mixtures of these compounds can also be used.

Suitable acid hardening resins—these are resins which harden in the presence of acids—which can be hardened with the catalysts according to the invention under the influence of light are, for example: phenol resins and aminoplasts, especially urea and melamine resins, either separately or in combination with other resins, such as nitrocellulose, alkyd resins and other polyesters. They can be used as varnishes, for reproduction purposes, e.g., as socalled photo-resist varnishes, but also for the coating of textiles. The compounds according to the invention can also serve for the acid hardening of epoxy resins and for the activation of methylol compounds, e.g. methylol ethers of polycarboxylic acid amides, such as polyacrylic and methacrylic acid amides, and polymers containing carbamic acid esters of N-methylol-amides.

The claimed compounds are expediently added to the resins in amounts of about 0.1 to about 10, preferably of about 1 to about 6, percent by weight, referring to the resin to be hardened which may be dissolved in the usual solvents.

Mixtures of this type have virtually unlimited storage stability in the dark, but when they are illuminated with ultraviolet light which can be generated with the usual light sources, the desired gelling sets in and hardening takes place either immediately or after the usual stoving time, depending on the composition of the resin.

EXAMPLE 1

An acid hardening varnish consists of the following components: 60 parts by weight of a 60% solution of an alkyd resin in butanol (the alkyd resin was prepared by condensing 90.2 parts by weight castor oil, 128.4 parts by weight soya bean oil, 95.1 parts by weight trimethylolpropane, 76.3 parts by weight pentaerythritol, 14.3 parts by weight benzoic acid and 196.8 parts by weight phthalic acid anhydride up to acid number 8 and hydroxyl number 170); 40 parts by weight of a commercial 60% solution of an urea-formaldehyde condensate in butanol; 7 parts by weight ethyl glycol; 7 parts by weight butanol; 7 parts by weight ethanol; and 1 part by weight of a 1% solution of silicone oil in xylene.

This varnish is mixed with additives according to the table. The resultant mixtures are applied to glass plates by means of a film extruder (100$\mu$) and then further treated according to the table. The high pressure burner used for illumination is an apparatus manufactured by Quarzlampengesellschaft m.b.h., Hanau (5500), which acts on the films from a distance of 20 cm.

TABLE

| Initiator | Additive as parts by weight, referred to the varnish | Time required for complete hardening (min.) when illumination with— | | |
|---|---|---|---|---|
| | | Daylight | High press. burner | 2 min. high press. burner, then daylight |
| (1) 4,4'-bis-bromomethyl-benzophenone | 2.2 | >180 | 6 | 40 |
| (2) p-benzoyl-benzyl bromide | 1.6 | >180 | 8 | 40 |
| (3) p-benzyl-benzal bromide | 2.1 | >180 | 6.5 | 40 |
| (4) p-benzoyl-benzal chloride | 1.6 | >180 | 5.5 | 30 |
| (5) p-benzoyl benzotrichloride | 2.3 | >180 | 6.5 | 30 |

When the mixtures (1) to (5) are hardened according to the table, they still show the same course of reaction after dark storage at room temperature for 5 months.

EXAMPLE 2

88 parts by weight of a polyester which contains terephthalic acid radicals as acid radicals and bis-ethoxylated bisphenol A and glycerol as alcoholic components and which has been condensed to a viscosity of 50 seconds (measured in a DIN beaker or a 40% solution of the polyester in ethyl glycol acetate), 12 parts by weight hexa-bis-(methoxymethyl)-melamine and 3 parts by weight p-benzoyl benzotrichloride are dissolved in 500 parts by weight methylene chloride. A metal plate is evenly coated with this solution with a thickness of 100μ and allowed to dry in air. A firm tack-free film is obtained. This film is illuminated through a negative for 20 seconds with the light of a high pressure mercury lamp (type Philips HPK-125 W.) placed at a distance of 20 cm. After heating the coated plate at 120° C. for 20 minutes, the non-exposed parts of the film can easily be detached with the aid of methylene chloride, whereas a firm film of good adhesion has formed on the illuminated areas.

What we claim is:

1. A composition comprising a phenol resin, a urea formaldehyde resin, a melamine formaldehyde resin or an epoxy resin which is hardenable in the presence of an acid and, as a hardening catalyst which is activated by ultraviolet light, from about 0.1 to about 10% by weight, based on the weight of said resin, of at least one compound of the formula

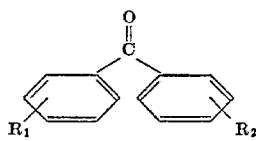

wherein $R_1$ is $CH_2X$, $CHX_2$ or $CX_3$, $R_2$ is H, $CH_3$, $CH_2X$, $CHX_2$ or $CX_3$ and X is halogen.

2. The composition of claim 1 wherein X is chlorine or bromine.

3. The composition of claim 1 wherein the compound of the formula is p-benzoyl-benzyl chloride,
p-benzoyl-benzal chloride,
p-benzoyl-benzotrichloride,
p-benzoyl-benzyl bromide,
p-benzoyl-benzal bromide,
p-benzoyl-benzotribromide,
4,4'-bis-chloromethyl-benzophenone,
4,4'-dichloro-methyl-benzophenone,
4,4'-bis-trichloromethylbenzophenone,
4,4'-bromomehtylbenzophenone,
4,4'-bis-dibromomethyl-benzophenone,
4,4'-bis-tribromomethyl-benzophenone or
o-benzoyl-benzotrichloride.

4. The composition of claim 1 wherein there is from about 1 to about 6% by weight, based on the weight of said resin, of said compound of said formula.

5. The hardened resin composition obtained by exposing a composition of claim 1 to ultraviolet light.

6. An article having a complete or partial coating of the hardened resin composition of claim 5.

References Cited

UNITED STATES PATENTS

| | | | |
|---|---|---|---|
| 3,387,035 | 6/1968 | Gray et al. | 260—591 |
| 3,530,188 | 9/1970 | Kim et al. | 260—591 |
| 3,556,791 | 1/1971 | Suzuki et al. | 96—115 P |
| 3,462,355 | 8/1969 | Griffith | 204—159.23 |
| 2,777,828 | 1/1957 | Day et al. | 260—45.95 |
| 1,587,274 | 6/1926 | Beebe et al. | 96—115 P |
| 3,427,161 | 2/1969 | Laridon et al. | 96—35.1 |

FOREIGN PATENTS

| | | | |
|---|---|---|---|
| 632,188 | 12/1961 | Canada | 204—159.23 |

DONALD E. CZAJA, Primary Examiner

R. W. GRIFFIN, Assistant Examiner

U.S. Cl. X.R.

96—115 P; 117—124 E, 132 R, 132 BE, 132 BF, 161 L, 161 LN, 161 ZB; 204—159.11; 260—22 CA, 22 CQ, 47 EP, 47 R, 57 R, 67.6 R 69 R